(12) United States Patent
Ding et al.

(10) Patent No.: US 11,296,547 B2
(45) Date of Patent: Apr. 5, 2022

(54) DISTRIBUTION TRANSFORMER TERMINAL AND METHOD FOR MONITORING A STATE OF A DISTRIBUTION TRANSFORMER COURT DEVICE

(71) Applicants: ELECTRIC POWER SCIENCE & RESEARCH INSTITUTE OF STATE GRID TIANJIN ELECTRIC POWER COMPANY, Tianjin (CN); STATE GRID TIANJIN ELECTRIC POWER COMPANY, Tianjin (CN); STATE GRID CORPORATION OF CHINA, Beijing (CN); SHANGHAI WISCOM SUNEST ELECTRIC POWER TECHNOLOGY CO., LTD., Shanghai (CN)

(72) Inventors: Yi Ding, Tianjin (CN); Pan Zhang, Tianjin (CN); Yu Zhang, Tianjin (CN); Ping Tang, Tianjin (CN); Ning Jiang, Tianjin (CN); Yanjun Wen, Shanghai (CN); Haibiao Wang, Tianjin (CN); Xudong Wang, Tianjin (CN); Qinghu Hu, Tianjin (CN); Xianxu Huo, Tianjin (CN); Chao Huang, Tianjin (CN); Yan Qi, Tianjin (CN); Wangxi Xue, Shanghai (CN); Guodong Li, Tianjin (CN); Ke Xu, Tianjin (CN); Qiuliang Jiao, Tianjin (CN)

(73) Assignees: ELECTRIC POWER SCIENCE & RESEARCH INSTITUTE OF STATE GRID TIANJIN ELECTRIC POWER, Tianjin (CN); STATE GRID TIANJIN ELECTRIC POWER COMPANY, Tianjin (CN); STATE GRID CORPORATION OF CHINA, Beijing (CN); SHANGAI WISCOM SUNEST ELECTRIC POWER TECHNOLOGY CO., LTD., Shanghai (CN)

( * ) Notice: Subject to any disclaimer, the term of this patent is extended or adjusted under 35 U.S.C. 154(b) by 133 days.

(21) Appl. No.: 16/635,731
(22) PCT Filed: Sep. 19, 2019
(86) PCT No.: PCT/CN2019/109146
  § 371 (c)(1),
  (2) Date: Jan. 31, 2020
(87) PCT Pub. No.: WO2020/063977
  PCT Pub. Date: Apr. 2, 2020

(65) Prior Publication Data
  US 2021/0218274 A1    Jul. 15, 2021

(30) Foreign Application Priority Data
  Sep. 30, 2018 (CN) .......................... 201811154223.8

(51) Int. Cl.
  *H02J 13/00* (2006.01)
(52) U.S. Cl.
  CPC .. *H02J 13/00022* (2020.01); *H02J 13/00002* (2020.01)
(58) Field of Classification Search
  CPC ........... H02J 13/00022; H02J 13/00002; H02J 13/00; H02J 13/0013; H02J 13/0075; Y02E 60/7853; Y02E 60/00; Y04S 40/126
  See application file for complete search history.

(56) References Cited

U.S. PATENT DOCUMENTS

| 2005/0235174 A1* | 10/2005 | Curt .................... H02J 13/0075 713/340 |
| 2011/0258018 A1* | 10/2011 | Tyagi ....................... H02J 3/14 705/7.33 |

(Continued)

FOREIGN PATENT DOCUMENTS

| CN | 102403798 A | 4/2012 |
| CN | 106772499 A | 5/2017 |

(Continued)

*Primary Examiner* — Hal Kaplan
*Assistant Examiner* — Thai H Tran
(74) *Attorney, Agent, or Firm* — Arent Fox LLP

(57) ABSTRACT

Disclosed are a distribution transformer terminal and a method for monitoring a state of a distribution transformer court device. The distribution transformer terminal includes an ARM core processor, a carrier communication module connected to a court device, a sub-G wireless communication module connected to the court device and a GPS module connected to the court device. The ARM core processor is connected to the carrier communication module, the sub-G wireless communication module and the GPS module. The ARM core processor is configured to identify a phase of the court device and a court to which the court device belongs, acquire an operating state and fault information of the court device through the sub-G wireless communication module, and acquire geographical location information of the court device through the GPS module.

5 Claims, 4 Drawing Sheets

(56) References Cited

U.S. PATENT DOCUMENTS

| | | | |
|---|---|---|---|
| 2013/0024149 A1* | 1/2013 | Nayar | G01R 29/18 |
| | | | 702/72 |
| 2013/0241746 A1* | 9/2013 | McKinley | G01R 19/2513 |
| | | | 340/870.02 |

FOREIGN PATENT DOCUMENTS

| | | |
|---|---|---|
| CN | 107153151 A | 9/2017 |
| CN | 206532409 U | 9/2017 |
| CN | 107689817 A | 2/2018 |
| CN | 109378898 A | 2/2019 |
| JP | 2004229456 A | 8/2004 |

* cited by examiner

DISTRIBUTION TRANSFORMER TERMINAL AND METHOD FOR MONITORING A STATE OF A DISTRIBUTION TRANSFORMER COURT DEVICE

CROSS-REFERENCES TO RELATED APPLICATIONS

This application is a United States National Stage Application of co-pending International Patent Application Number PCT/CN2019/109146, filed on Sep. 29, 2019, which claims priority to a Chinese patent application No. 201811154223.8, filed on Sep. 30, 2018, the contents of which are incorporated herein by reference in their entireties.

TECHNICAL FIELD

The present application belongs to the field of operation of a distribution transformer court, for example, and relates to a distribution transformer terminal and a method for monitoring a state of a distribution transformer court device.

BACKGROUND

Secondary devices of a low voltage distribution network have various functions, a scattered layout and are isolated from each other. An intelligent distribution transformer terminal with functions of device monitoring, reactive power compensation, electric energy quality inspection, line loss calculation, three-phase imbalance management and the like can hardly comprehensively perceive information such as a phase of a monitoring court to which a device belongs and location of the device, such that fault occurrence points can hardly be monitored.

SUMMARY

The present application provides a distribution transformer terminal and a method for monitoring a state of a distribution transformer court device, which can improve an intelligence level of a power distribution network, and achieve perception and monitoring of an operation of a court, location identification, and fault occurrence point determination.

A distribution transformer terminal includes an advanced reduced instruction set computer machine (ARM) core processor, a carrier communication module, a sub-G wireless communication module and a global positioning system (GPS) module. The ARM core processor is connected to the carrier communication module, the carrier communication module is arranged to be connected to a court device, the ARM core processor is configured to identify a phase of the court device and a court to which the court device belongs. The ARM core processor is connected to the sub-G wireless communication module, the sub-G wireless communication module is arranged to be connected to the court device, and the ARM core processor is further configured to acquire an operating state and fault information of the court device through the sub-G wireless communication module. The ARM core processor is further connected to the GPS module, the GPS module is arranged to be connected to the court device, and the ARM core processor is further configured to acquire geographical location information of the court device through the GPS module. The ARM core processor is further configured to upload the phase, the court, the operating state, the fault information, and the geographical location information of the court device to a scheduling system.

In an embodiment, the ARM core processor is further arranged to be connected to a main station via a backplane signal interface module and is configured to upload a topological structure, the phase, the court, and the geographical location information of the court device to the main station. The court device includes multiple court devices, the topological structure of the court device is generated according to respective courts of the court devices, or the topological structure of the court device is generated according to respective phases and courts of the court devices. The court devices include a phase-change switch, a distributed power source, a charging pile and a main meter. An output end of the carrier communication module is arranged to be connected to the phase-change switch, the distributed power source, the charging pile and the main meter via a power line interface module. An output end of the sub-G wireless communication module is arranged to be connected to the phase-change switch, the distributed power source, the charging pile and the main meter via an antenna module. An output end of the GPS module is arranged to be connected to the phase-change switch, the distributed power source, the charging pile and the main meter via the antenna module.

A method for monitoring a state of a distribution transformer court device includes the following steps:

a distribution transformer terminal identifies a court and a phase of a court device by using a carrier communication module at preset time intervals, to acquire the court to which the court device belongs and the phase of the court device;

the distribution transformer terminal acquires geographical location information of the court device by using a global positioning system (GPS) module; and the distribution transformer terminal uploads a topological structure, the phase, the court and the geographical location information of the court device to a scheduling system by using a broadband carrier or a sub-G wireless communication module.

In an embodiment, the step in which the distribution transformer terminal identifies the court and the phase of the court device by using the carrier communication module includes one of following steps:

in a case where a power frequency carrier modulation signal sent by the court device is received via an A-phase power line of an output end of the carrier communication module, it is determined that the court device and the distribution transformer terminal belong to a same court, and that the court device belongs to an A-phase;

in a case where the power frequency carrier modulation signal sent by the court device is received via a B-phase power line of the output end of the carrier communication module, it is determined that the court device and the distribution transformer terminal belong to a same court, and that the court device belongs to a B-phase; or in a case where the power frequency carrier modulation signal sent by the court device is received via a C-phase power line of the output end of the carrier communication module, it is determined that the court device and the distribution transformer terminal belong to a same court, and that the court device belong to a C-phase.

In an embodiment, the sub-G wireless communication module includes a personal area network (PAN) coordinator, and the sub-G wireless communication module establishes a network in the following manner:

a main PAN coordinator sets the main PAN coordinator as a cluster head with a cluster identifier (CID) of 0, where the main PAN coordinator is disposed at the distribution transformer terminal;

the main PAN coordinator selects a PAN identifier unused in a currently established network, and broadcasts a beacon frame containing the PAN identifier, to enable a first PAN coordinator receiving the beacon frame to send a first network joining request to the main PAN coordinator, where the first PAN coordinator is disposed in the court device, and the first network joining request includes the PAN identifier and identification information of the first PAN coordinator;

upon receiving the first network joining request, the main PAN coordinator determines whether a sub-network formed by the first PAN coordinator associated with the PAN identifier satisfies a preset condition;

if the sub-network does not satisfy the preset condition, the main PAN coordinator accepts the first PAN coordinator to join the currently established network, and adds the first PAN coordinator as a network node in the currently established network into a neighboring table;

if the sub-network satisfies the preset condition, the main PAN coordinator rejects the first PAN coordinator to join the currently established network, and designates the first PAN coordinator as a sub-main PAN coordinator serving as a new cluster head, allocates a new PAN identifier to the sub-main PAN coordinator, and sets a CID of the sub-main PAN coordinator to 0, to enable the sub-main PAN coordinator to broadcast a beacon frame containing the new PAN identifier, where a second PAN coordinator is disposed in the court device;

when the main PAN coordinator receives a second network joining request of the second PAN coordinator from the sub-main PAN coordinator, the main PAN coordinator designates the second PAN coordinator as a sub-main PAN coordinator serving as a new cluster head, allocates a new PAN identifier to the sub-main PAN coordinator, and sets the CID of the sub-main PAN coordinator to 0, where the second network joining request includes the new PAN identifier and identification information of the second PAN coordinator.

In an embodiment, the distribution transformer terminal receives, from the court device, a fault state and the geographical location information of the court device by using the carrier communication module, and reports the fault state and the geographical location information of the court device to a main station through a fourth generation (4G) public network or a private network/an Ethernet, to enable the main station to inform a maintenance personnel to deal with fault information; or the distribution transformer terminal receives the fault state and the geographical location information of the court device by using the sub-G wireless communication module, and reports the fault state and the geographical location information of the court device to the main station through the 4G public network or the private network/the Ethernet, to enable the main station to inform the maintenance personnel to deal with the fault information.

DETAILED DESCRIPTION

An embodiment of the present application will be described below with reference to the drawings.

Figure 1:
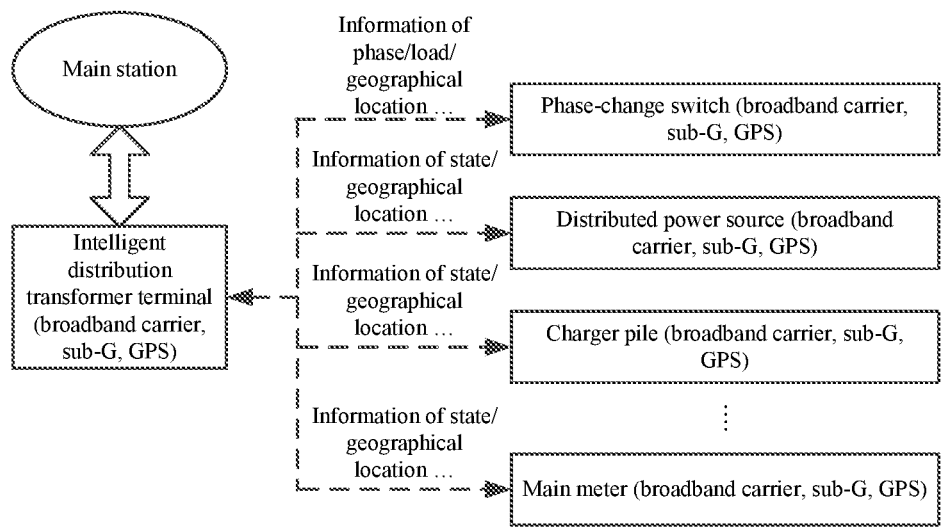
FIG. 1 is a block diagram of a system for monitoring a state of a distribution transformer court device provided in an embodiment of the present application.
Figure 2:
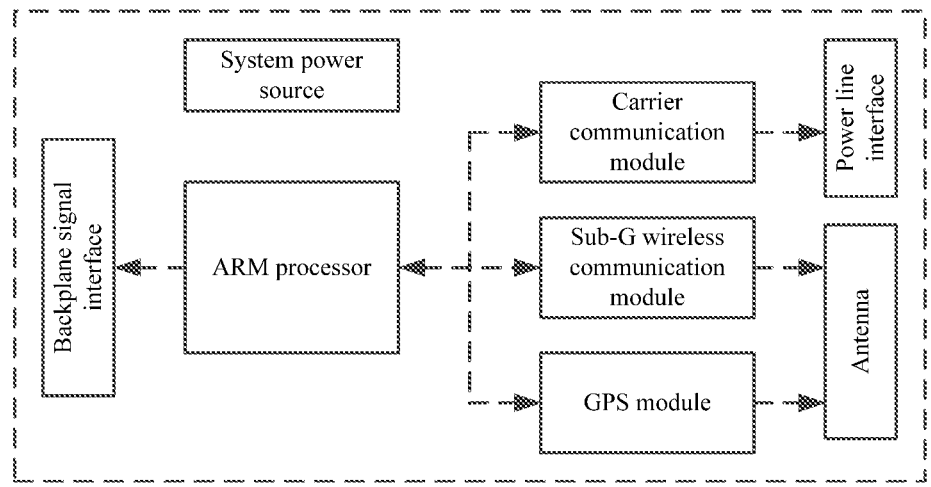
FIG. 2 is a schematic diagram of a distribution transformer terminal provided in the embodiment of the present application.

FIG. 1 is a block diagram of a system 100 for monitoring a state of a distribution transformer court device provided in the present application, and FIG. 2 is a schematic diagram of a distribution transformer terminal 200 provided in the embodiment of the present application. Reference is made to FIG. 1 and FIG. 2, the distribution transformer terminal includes an advanced reduced instruction set computer machine (ARM) core processor 202, a carrier communication module 204, a sub-G wireless communication module 206 and a global positioning system (GPS) module 208. The ARM core processor is connected to the carrier communication module, the carrier communication module is arranged to be connected to a court device 102, the ARM core processor is configured to identify a phase of the court device and a court to which the court device belongs. The ARM core processor is further connected to the sub-G wireless communication module, the sub-G wireless communication module is arranged to be connected to the court device, and the ARM core processor is further configured to acquire an operating state and fault information of the court device through the sub-G wireless communication module. The ARM core processor is further connected to the GPS module, the GPS module is arranged to be connected to the court device, and the ARM core processor is further configured to acquire geographical location information of the court device through the GPS module. The ARM core processor is further configured to upload the phase, the court, the operating state, the fault information, and the geographical location information of the court device to a scheduling system.

In an embodiment, the ARM core processor 202 is further arranged to be connected to a main station 104 via a backplane signal interface module 210 and is configured to upload a topological structure, the phase, the court, and the geographical location information of the court device to the main station. The court device includes multiple court devices 102, the topological structure of the court device is generated according to respective courts of the court devices, or the topological structure of the court device is generated according to respective phases and courts of the court devices. The court devices 102 include a phase-change switch, a distributed power source, a charging pile and a main meter. An output end of the carrier communication module 204 is arranged to be connected to the phase-change switch, the distributed power source, the charging pile and the main meter via a power line interface module 212. An output end of the sub-G wireless communication module 206 is arranged to be connected to the phase-change switch, the distributed power source, the charging pile and the main meter via an antenna module 214. An output end of the GPS module 208 is arranged to be connected to the phase-change switch, the distributed power source, the charging pile and the main meter via the antenna module 214.

As shown in FIG. 2, the present application adopts an ARM architecture microprocessor, and the ARM processor is connected to a broadband carrier communication module through an Ethernet. The carrier communication module transmits a modulated signal to an opposite end through a power line to achieve a point-to-multipoint communication. The sub-G wireless communication module is connected to the ARM processor by using a serial peripheral interface (SPI), and the sub-G wireless communication module and the ARM processor form a personal area network (PAN) through a wireless signal and other modules. The GPS module is connected to the ARM processor through a universal asynchronous receiver/transmitter (UART) interface to acquire the geographical location information of the court device. According to the present application, an intelligent distribution transformer terminal is designed, which has broadband carrier communication capability and is capable of identifying whether the device belongs to the court and identifying the phase of the device in the court, a geographical location positioning of the device is achieved by means of the GPS; moreover, the phase, the operating state, the fault information, and the geographical location information of the device are sent to the scheduling system through a sub-G wireless communication, thereby achieving a refined control of an intelligent court.

Figure 4:
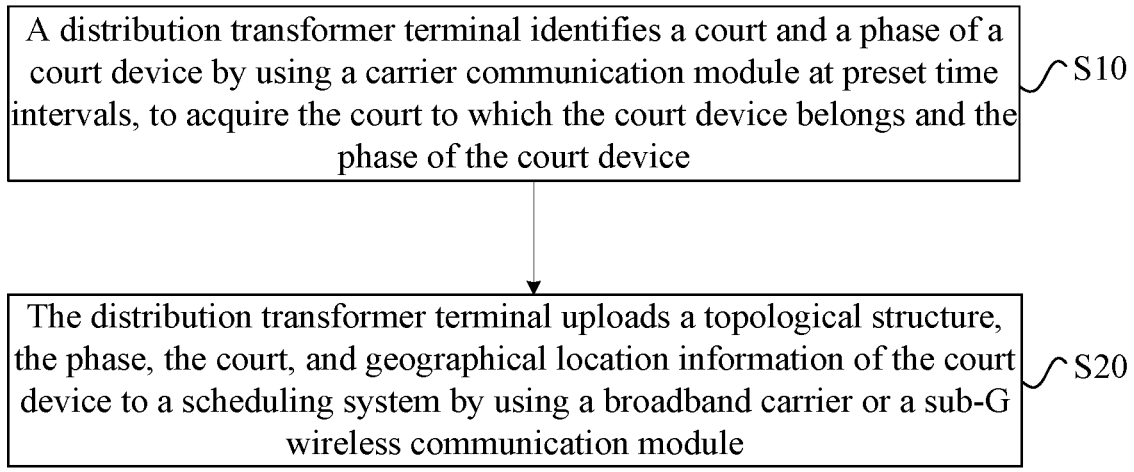
FIG. 4 is a flowchart of a method for monitoring a state of a distribution transformer court device provided in the mbodiment of the present disclosure.

A method for monitoring a state of a distribution transformer court device is provided. As shown in FIG. 4, the method includes step 10 and step 20.

In step 10, a distribution transformer terminal identifies a court and a phase of a court device by using a carrier communication module at preset time intervals, to acquire the court to which the court device belongs and the phase of the court device.

In an embodiment, the preset time interval is 15 minutes.

Low voltage power line carrier communication uses a court transformer as a unit and is matched with an intelligent distribution transformer terminal for use. In a case of a trans-transformer court, due to signal isolation attenuation at two transformers, different courts are often unable to communicate successfully through a carrier signal, and therefore whether the court device belongs to this court may be determined according to whether the intelligent distribution transformer terminal may successfully receive a data sent by the carrier communication module.

In an embodiment, the step 10 includes one of followings: in a case where a power frequency carrier modulation signal sent by the court device is received via an A-phase power line of an output end of the carrier communication module, it is determined that the court device and the distribution transformer terminal belong to a same court, and that the court device belongs to an A-phase; in a case where the power frequency carrier modulation signal sent by the court device is received via a B-phase power line of the output end of the carrier communication module, it is determined that the court device and the distribution transformer terminal belong to a same court, and that the court device belongs to a B-phase; or in a case where the power frequency carrier modulation signal sent by the court device is received via a C-phase power line of the output end of the carrier communication module, it is determined that the court device and the distribution transformer terminal belong to a same court, and that the court device belong to a C-phase.

In step 20, the distribution transformer terminal uploads a topological structure, the phase, the court, and geographical location information of the court device to a scheduling system by using a broadband carrier or a sub-G wireless communication module.

In an embodiment, the sub-G wireless communication module includes a personal area network (PAN) coordinator, the sub-G wireless communication module establishes a network in the following manner: a main PAN coordinator sets the main PAN coordinator as a cluster head with a cluster identifier (CID) of 0, where the main PAN coordinator is disposed at the distribution transformer terminal; the main PAN coordinator selects a PAN identifier unused in a currently established network, and broadcasts a beacon frame containing the PAN identifier, to enable a first PAN coordinator receiving the beacon frame to send a first network joining request to the main PAN coordinator, where the first PAN coordinator is disposed in the court device, and the first network joining request includes the PAN identifier and identification information of the first PAN coordinator; upon receiving the first network joining request, the main PAN coordinator determines whether a sub-network formed by the first PAN coordinator associated with the PAN identifier satisfies a preset condition; if the sub-network does not satisfy the preset condition, the main PAN coordinator accepts the first PAN coordinator to join the currently established network, and adds the first PAN coordinator as a network node in the currently established network into a neighboring table; if the sub-network satisfies the preset condition, the main PAN coordinator rejects the first PAN coordinator to join the currently established network, and designates the first PAN coordinator as a sub-main PAN coordinator serving as a new cluster head, allocates a new PAN identifier to the sub-main PAN coordinator, and sets a CID of the sub-main PAN coordinator to 0, to enable the sub-main PAN coordinator to broadcast a beacon frame containing the new PAN identifier, where a second PAN coordinator is disposed in the court device; when the main PAN coordinator receives a second network joining request of the second PAN coordinator from the sub-main PAN coordinator, the main PAN coordinator designates the second PAN coordinator as a sub-main PAN coordinator serving as a new cluster head, allocates a new PAN identifier to the sub-main PAN coordinator, and sets the CID of the sub-main PAN coordinator to 0, where the second network joining request includes the new PAN identifier and identification information of the second PAN coordinator.

In a case where the sub-main PAN coordinator receives the sent second network joining request of the second PAN coordinator, the sub-main PAN coordinator determines whether a sub-network formed by the first PAN coordinator associated with the new PAN identifier satisfies a preset condition; if the sub-network does not satisfy the preset condition, the sub-main PAN coordinator accepts the first PAN coordinator to join the currently established network, and informs the main PAN coordinator to add a sub-target PAN coordinator as a network node into the neighboring table.

In this embodiment, the sub-network formed by the first PAN coordinator associated with the same PAN identifier is a cluster network.

In an embodiment, in a case where the main PAN coordinator determines that the currently established network satisfies a specified condition, all of the PAN coordinators in the network are informed to stop sending the beacon frame. In a case where the main PAN coordinator determines that the currently established network satisfies a bandwidth requirement, all of the PAN coordinators in the network are informed to stop sending the beacon frame; or in a case where the main PAN coordinator determines that no PAN coordinator may join the currently established network, all of the PAN coordinators in the network are informed to stop sending the beacon frame.

A Sub-G wireless communication network adopts a tree cluster topological structure, which is an application form of a point-to-point network topological structure. In the tree cluster, distribution transformer terminals are full function devices (FFD) (e.g., full function device main coordinators), and reduced function devices (RFD) (e.g., distributed power sources, charging piles, unbalanced management phase-change switches) are leaf nodes connected to the end of branches of the tree cluster topological structure.

Figure 5:
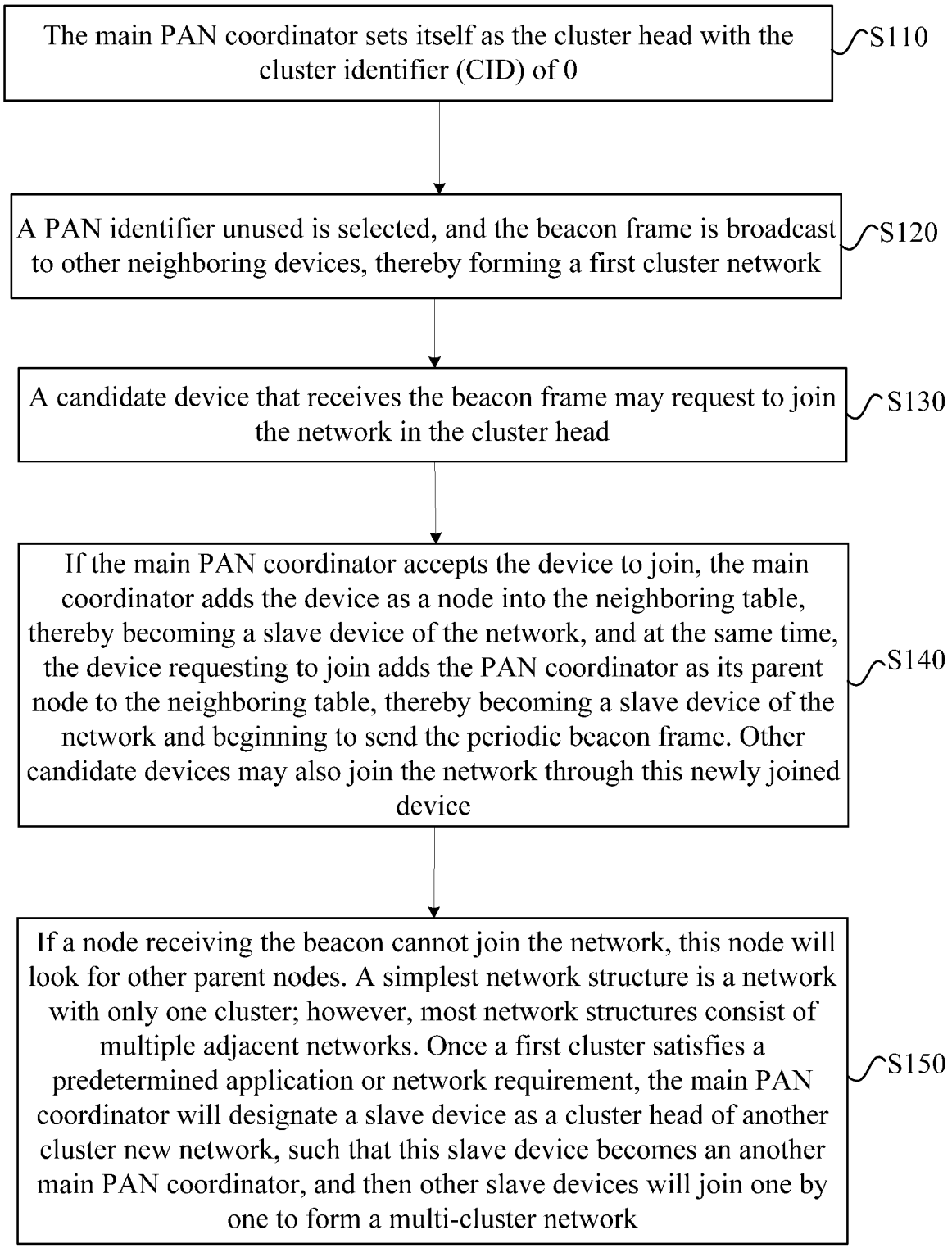
FIG. 5 is a flowchart of a method for establishing a PAN provided in the mebodiment of the present disclosure.

In an embodiment, as shown in FIG. 5, the step in which the PAN is established includes steps described below.

In step 110, the main PAN coordinator (e.g. first PAN coordinator 302 in FIG. 3) sets itself as the cluster head with the cluster identifier (CID) of 0.

In step 120, a PAN identifier unused is selected, and the beacon frame is broadcast to other neighboring devices, thereby forming a first cluster network.

In step 130, a candidate device (e.g. device 306 in FIG. 3 or the court device) that receives the beacon frame may request to join the network in the cluster head.

In step 140, if the main PAN coordinator accepts the device to join, the main coordinator adds the device as a node into the neighboring table, thereby becoming a slave device of the network, and at the same time, the device requesting to join adds the PAN coordinator as its parent node to the neighboring table, thereby becoming a slave device of the network and beginning to send the periodic beacon frame. Other candidate devices may also join the network through this newly joined device.

In step 150, if a node receiving the beacon cannot join the network, this node will look for other parent nodes. A simplest network structure is a network with only one cluster; however, most network structures consist of multiple adjacent networks. Once a first cluster satisfies a predetermined application or network requirement, the main PAN coordinator will designate a slave device as a cluster head of another cluster new network, such that this slave device becomes another main PAN coordinator (e.g. PAN coordinator 304 in FIG. 3), and then other slave devices will join one by one to form a multi-cluster network.

Figure 3:
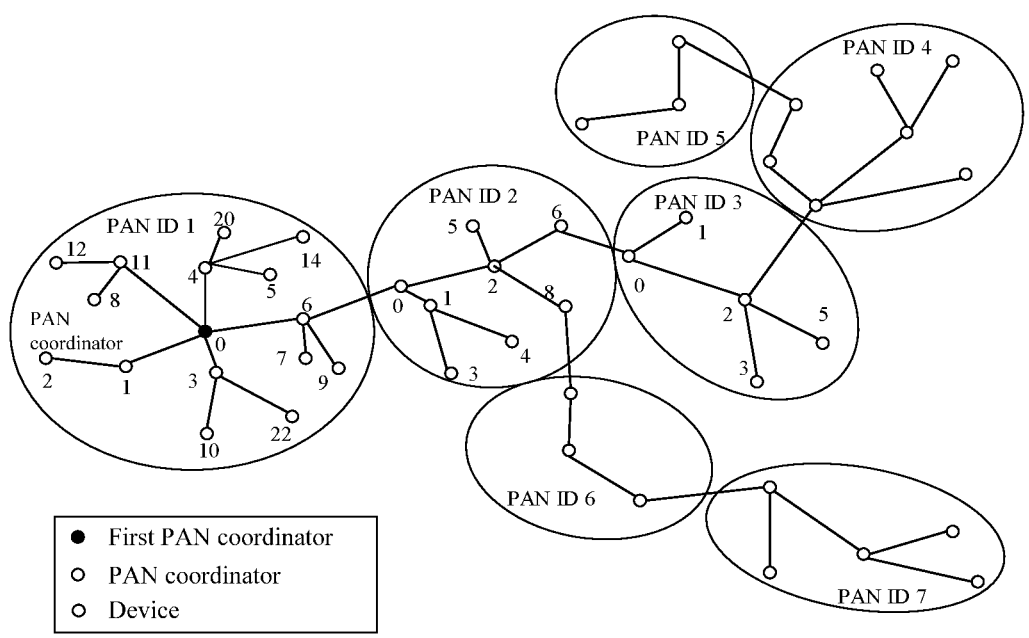
FIG. 3 is a schematic diagram of a multi-basic service set (BSS) network provided in the embodiment of the present disclosure.

As shown in FIG. 3, the straight line in FIG. 3 represents a parent-child relationship between devices rather than a communication stream.

In an embodiment, the above-mentioned method further includes at least one of: the distribution transformer terminal receives, from the court device, a fault state and the geographical location information of the court device by using the carrier communication module, and reports the fault state and the geographical location information of the court device to a main station through a fourth generation (4G) public network or a private network/an Ethernet, to enable the main station to inform a maintenance personnel to deal with fault information; or the distribution transformer terminal receives the fault state and the geographical location information of the court device by using the sub-G wireless communication module, and reports the fault state and the geographical location information of the court device to the main station through the 4G public network or the Ethernet, to enable the main station to inform the maintenance personnel to deal with the fault information.

In a case where a line between the distribution transformer terminal and the court device is not powered off, the court device sends the fault state and the geographical location information of the court device in the form of a carrier, for example, the court device sends the fault state and the geographical local information of the court device to the carrier communication module in the distribution transformer terminal through the carrier communication module of the court device; in a case where the line between the distribution transformer terminal and the court device is powered off, the court device uses its own backup battery and sends the fault state and the geographical local information to the distribution transformer terminal by using the sub-G wireless communication module.

A working principle of the present application is as follows.

The implementation of the present application benefits from the following aspects: a relatively stable and mature low voltage broadband carrier communication technology, the carrier communication being based on a power line network without erecting a communication channel, and the characteristics of a sub-G wireless ad hoc network.

In the present application, the phase to which the court device (including the main meter, a concentrator, a circuit breaker, a reactive compensation capacitor device, an unbalanced management phase-change switch, a distributed power source and a charging pile) belongs is identified through a broadband carrier wave, the broadband carrier wave may not work any more when a fault occurs, a fault point and the geographical local information are sent to the intelligent distribution transformer terminal through the sub-G wireless communication module, and the fault point and the geographical local information, from the distribution transformer terminal, are sent to the main station through the 4G public network or the Ethernet.

The 4G public network and the Ethernet may be adopted for uplink communication between the intelligent distribution transformer terminal and the main station. An intelligent distribution transformer terminal downlink device performs data interaction by adopting a RS485 communication mode, a low voltage broadband carrier communication mode, a sub-G wireless communication mode and the like.

The present application is based on the intelligent distribution transformer and refers to a device which incorporates a peripheral device and the court into a user side mainly by using the low voltage broadband carrier communication technology, a sub-G wireless communication technology and a GPS system, this device enables the identification of a user transformer and the geographical position identification on the operating state of the whole court, thereby achieving a refined intelligent management and control over secondary device of the court.

In the present application, a Sub-G wireless networking technology is adopted, and communication distance and communication reliability of network communication are increased.

In the present application, by using the broadband carrier, the sub-G technology and the GPS positioning, identification of a device subordinate to the court and a geographical location discrimination may be achieved without electric meter user information, and the topological structure of the device and geographical information of a geographic information system or a geo-information system (GIS) are generated, thereby achieving full management and control of the state of the device.

In this application, even if a power failure fault has occurred in the region, the system may still work normally, provides an accurate geographical location and state information of the fault, thereby enabling online, transparent, and intelligent information and service processing.

What is claimed is:

1. A distribution transformer terminal, comprising an advanced reduced instruction set computer machines (ARM) core processor, a carrier communication module, a sub-G wireless communication module and a global positioning system (GPS) module, wherein the ARM core processor is connected to the carrier communication module, the carrier communication module is arranged to be connected to a court device, the ARM core processor is configured to identify a phase of the court device and a court to which the court device belongs; the ARM core processor is further connected to the sub-G wireless communication module, the sub-G wireless communication module is arranged to be connected to the court device, and the ARM core processor is further configured to acquire an operating state and fault information of the court device through the sub-G wireless communication module; the ARM core processor is further connected to the GPS module, the GPS module is arranged to be connected to the court device, and the ARM core processor is further configured to acquire geographical location information of the court device through the GPS module; the ARM core processor is further configured to upload the phase, the court, the operating state, the fault information, and the geographical location information of the court device to a scheduling system;

wherein the sub-G wireless communication module comprises personal area network (PAN) coordinators, the sub-G wireless communication module establishes a network in the following manner:

setting, by a main PAN coordinator, the main PAN coordinator as a cluster head with a cluster identifier (CID) of 0, wherein the main PAN coordinator is disposed at the distribution transformer terminal;

selecting, by the main PAN coordinator, a PAN identifier unused in a currently established network, and broadcasting a beacon frame containing the PAN identifier, to enable a first PAN coordinator receiving the beacon frame to send a first network joining request to the main PAN coordinator, wherein the first PAN coordinator is disposed in the court device, and the first network joining request comprises the PAN identifier and identification information of the first PAN coordinator;

upon receiving the first network joining request, determining, by the main PAN coordinator, whether a sub-network formed by the first PAN coordinator associated with the PAN identifier satisfies a preset condition;

in response to determining that the sub-network does not satisfy the preset condition, accepting, by the main PAN coordinator, the first PAN coordinator to join the currently established network, and adding the first PAN coordinator as a network node in the currently established network into a neighboring table;

in response to determining that the sub-network satisfies the preset condition, rejecting, by the main PAN coordinator, the first PAN coordinator to join the currently established network, and designating the first PAN coordinator as a sub-main PAN coordinator serving as a new cluster head, allocating a new PAN identifier to the sub-main PAN coordinator, and setting a CID of the sub-main PAN coordinator to 0, to enable the sub-main PAN coordinator to broadcast a beacon frame containing the new PAN identifier, wherein a second PAN coordinator is disposed in the court device;

upon receiving from the sub-main PAN coordinator, a second network joining request of the second PAN coordinator, designating, by the main PAN coordinator, the second PAN coordinator as a sub-main PAN coordinator serving as a new cluster head, allocating a new PAN identifier to the sub-main PAN coordinator, and setting the CID of the sub-main PAN coordinator to 0, wherein the second network joining request comprises the new PAN identifier and identification information of the second PAN coordinator.

2. The terminal of claim 1, wherein the ARM core processor is further arranged to be connected to a main station via a backplane signal interface module and is configured to upload a topological structure, the phase, the court, and the geographical location information of the court device to the main station; wherein the court device comprises a plurality of court devices, the topological structure of the court device is generated according to respective courts of the plurality of court devices, or the topological structure of the court device is generated according to respective phases and courts of the plurality of court devices;

the plurality of court devices comprises a phase-change switch, a distributed power source, a charging pile and a main meter, wherein an output end of the carrier communication module is arranged to be connected to the phase-change switch, the distributed power source, the charging pile and the main meter via a power line interface module; an output end of the sub-G wireless communication module is arranged to be connected to the phase-change switch, the distributed power source, the charging pile and the main meter via an antenna module; and an output end of the GPS module is arranged to be connected to the phase-change switch, the distributed power source, the charging pile and the main meter via the antenna module.

3. A method for monitoring a state of a distribution transformer court device, comprising:

identifying, by a distribution transformer terminal, a court and a phase of a court device by using a carrier communication module at preset time intervals, to acquire the court to which the court device belongs and the phase of the court device;

acquiring, by the distribution transformer terminal, geographical location information of the court device by using a global positioning system (GPS) module; and uploading, by the distribution transformer terminal, a topological structure, the phase, the court and the geographical location information of the court device to a scheduling system by using a broadband carrier or a sub-G wireless communication module;

wherein the sub-G wireless communication module comprises personal area network (PAN) coordinators, the sub-G wireless communication module establishes a network in the following manner:

setting, by a main PAN coordinator, the main PAN coordinator as a cluster head with a cluster identifier (CID) of 0, wherein the main PAN coordinator is disposed at the distribution transformer terminal;

selecting, by the main PAN coordinator, a PAN identifier unused in a currently established network, and broadcasting a beacon frame containing the PAN identifier, to enable a first PAN coordinator receiving the beacon frame to send a first network joining request to the main PAN coordinator, wherein the first PAN coordinator is disposed in the court device, and the first network joining request comprises the PAN identifier and identification information of the first PAN coordinator;

upon receiving the first network joining request, determining, by the main PAN coordinator, whether a sub-network formed by the first PAN coordinator associated with the PAN identifier satisfies a preset condition;

in response to determining that the sub-network does not satisfy the preset condition, accepting, by the main PAN coordinator, the first PAN coordinator to join the currently established network, and adding the first PAN coordinator as a network node in the currently established network into a neighboring table;

in response to determining that the sub-network satisfies the preset condition, rejecting, by the main PAN coordinator, the first PAN coordinator to join the currently established network, and designating the first PAN coordinator as a sub-main PAN coordinator serving as a new cluster head, allocating a new PAN identifier to the sub-main PAN coordinator, and setting a CID of the sub-main PAN coordinator to 0, to enable the sub-main PAN coordinator to broadcast a beacon frame containing the new PAN identifier, wherein a second PAN coordinator is disposed in the court device;

upon receiving from the sub-main PAN coordinator, a second network joining request of the second PAN coordinator, designating, by the main PAN coordinator, the second PAN coordinator as a sub-main PAN coordinator serving as a new cluster head, allocating a new PAN identifier to the sub-main PAN coordinator, and setting the CID of the sub-main PAN coordinator to 0, wherein the second network joining request comprises the new PAN identifier and identification information of the second PAN coordinator.

4. The method of claim 3, wherein identifying the court and the phase of the court device by using the carrier communication module comprises one of:

in a case where a power frequency carrier modulation signal sent by the court device is received via an A-phase power line of an output end of the carrier communication module, determining that the court device and the distribution transformer terminal belong to a same court, and that the court device belongs to an A-phase;

in a case where the power frequency carrier modulation signal sent by the court device is received via a B-phase power line of the output end of the carrier communication module, determining that the court device and the distribution transformer terminal belong to a same court, and that the court device belongs to a B-phase; or in a case where the power frequency carrier modulation signal sent by the court device is received via a C-phase power line of the output end of the carrier communication module, determining that the court device and the distribution transformer terminal belong to a same court, and that the court device belong to is a C-phase.

5. The method of claim 3, wherein the method further comprises at least one of:

receiving, by the distribution transformer terminal, from the court device, a fault state and the geographical location information of the court device by using the carrier communication module, and reporting, by the distribution transformer terminal, the fault state and the geographical location information of the court device to a main station through a fourth generation (4G) public network or a private network/an Ethernet, to enable the main station to inform a maintenance personnel to deal with fault information; or sending, by the distribution transformer terminal, the fault state and the geographical location information of the court device by using the sub-G wireless communication module, and reporting, by the distribution transformer terminal, the fault state and the geographical location information of the court device to the main station through a 4G or the Ethernet, to enable the main station to inform the maintenance personnel to deal with the fault information.

\* \* \* \* \*

UNITED STATES PATENT AND TRADEMARK OFFICE
CERTIFICATE OF CORRECTION

| | | |
|---|---|---|
| PATENT NO. | : 11,296,547 B2 | |
| APPLICATION NO. | : 16/635731 | |
| DATED | : April 5, 2022 | |
| INVENTOR(S) | : Yi Ding et al. | |

It is certified that error appears in the above-identified patent and that said Letters Patent is hereby corrected as shown below:

On the Title Page

Item (22) PCT Filed: delete "Sep. 19, 2019" and substitute therefore -- Sep. 29, 2019 --.

Signed and Sealed this
Seventh Day of June, 2022

Katherine Kelly Vidal
*Director of the United States Patent and Trademark Office*